UNITED STATES PATENT OFFICE.

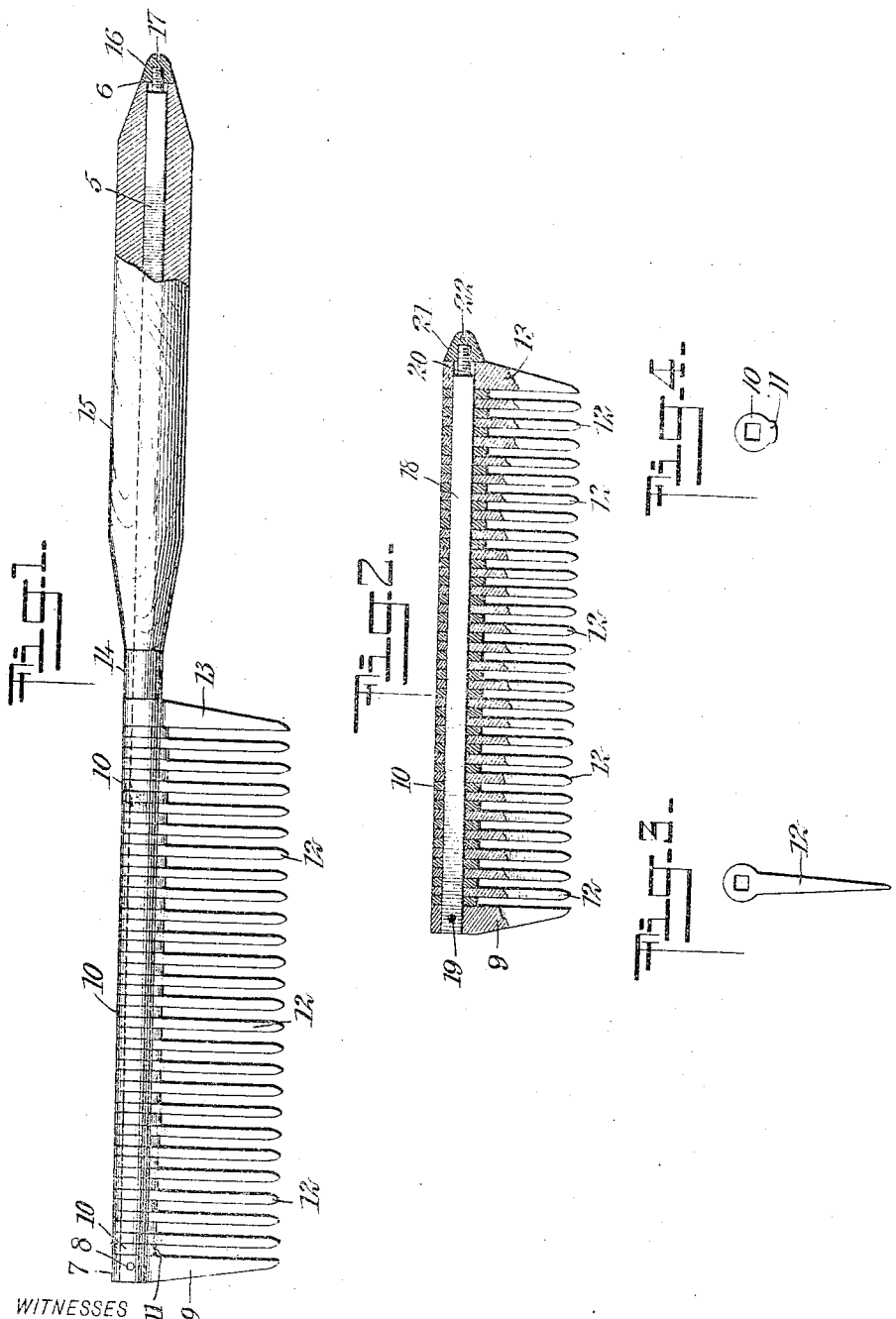

JOHN G. HIGGINS, OF CHATTANOOGA, TENNESSEE.

COMB.

No. 854,498.      Specification of Letters Patent.      Patented May 21, 1907.

Application filed June 5, 1906. Serial No. 320,246.

*To all whom it may concern:*

Be it known that I, JOHN G. HIGGINS, a citizen of the United States, and a resident of Chattanooga, in the county of Hamilton and State of Tennessee, have invented a new and Improved Comb, of which the following is a full, clear, and exact description.

My invention relates to combs, such, for instance, as are used for dressing the hair, my more particular object being to provide certain constructional details whereby the comb is rendered composite in character, its several parts being thus rendered interchangeable.

Reference is to be had to the accompanying drawings forming a part of this specification, in which similar characters of reference indicate corresponding parts in all the figures.

Figure 1 is a side elevation of one form of comb made in accordance with my invention, a part of the handle being broken away; Fig. 2 is a substantially vertical section through another form of comb also embodying my invention; Fig. 3 is a detail of a swinging tooth used in either form of comb; and Fig. 4 is a detail showing one of the washers 10 common to both forms of my comb.

A square rod 5 is provided at one of its ends with a reduced threaded portion 6. Upon its opposite end is mounted a tooth 9 having a collar 7 integral therewith, and passing through this collar and through the rod 5 is a rivet 8. A number of washers 10, each provided centrally with a square hole fitting the rod 5, are threaded upon the rod, and sandwiched between consecutive pairs of these washers are the teeth 12 of the comb. As shown in Fig. 3 each tooth 12 at its upper end is provided with a square hole, the latter fitting neatly upon the square rod 5. The end tooth 13, like the tooth 9, is comparatively large and strong and is fitted upon the rod 5 in the same manner as the other teeth.

A ferrule 14 and a wooden handle 15 encircle the rod 5. A nut 16 is threaded internally and fitted upon the reduced portion 6. This nut is provided with a slot 17 whereby it may be turned.

In order to assemble the parts of the comb shown in Fig. 1 the tooth 9 is first secured upon the rod 5 by means of the rivet 8; next a washer 10 is slipped over the rod, then a tooth 12 is applied, then a washer 10, then a tooth 12, and so on throughout the series. The last tooth 13 being fitted into position, the ferrule 14 and the handle 15 are slipped over the rod, and the nut 16 placed upon the threaded end and turned so as to clamp all of the teeth firmly together. A screw-driver may be fitted into the slot 17 to facilitate the clamping action. The comb is then ready for use.

In the form shown in Fig. 2 a square rod 18 has fitted upon one of its ends an end tooth 9 and is secured thereto by means of a rivet 19. The rod 18 is provided with a reduced threaded portion 20, upon which screws a nut 21, the latter being provided with a slot 22. The comb shown in this figure is assembled by slipping over the rod 18 the required number of teeth which are separated from each other by means of the washers 10. These washers, both in Fig. 1 and in Fig. 2, are each provided with a lobe 11 extending toward the ends of the teeth of the comb. These lobes brace the bases of the teeth and render them comparatively strong.

Having thus described my invention, I claim as new and desire to secure by Letters Patent:—

A comb comprising a rod polygonal in cross section, and having one end reduced and screw-threaded, a tooth secured to the other end, teeth having openings to fit the rod arranged thereupon, washers between the teeth, said washers having openings to fit the rod and having a lobe projecting therefrom toward the point of the teeth, whereby to brace the base of the teeth against each other, and a nut engaging the screw-threaded end, whereby to clamp the parts in their proper position.

In testimony whereof I have signed my name to this specification in the presence of two subscribing witnesses.

JOHN G. HIGGINS.

Witnesses:
     D. J. MURPHY,
     A. W. HASSELL.